United States Patent
Whitman

(10) Patent No.: US 9,084,410 B2
(45) Date of Patent: Jul. 21, 2015

(54) GROOMING DEVICE

(76) Inventor: Ralph Whitman, Coleman, MI (US)

(*) Notice: Subject to any disclaimer, the term of this patent is extended or adjusted under 35 U.S.C. 154(b) by 0 days.

(21) Appl. No.: 13/208,128

(22) Filed: Aug. 11, 2011

(65) Prior Publication Data

US 2012/0055415 A1    Mar. 8, 2012

Related U.S. Application Data

(60) Provisional application No. 61/372,825, filed on Aug. 11, 2010.

(51) Int. Cl.
*A01K 13/00* (2006.01)

(52) U.S. Cl.
CPC .................... *A01K 13/002* (2013.01)

(58) Field of Classification Search
CPC .................................... A01K 13/002
USPC ......... 119/600, 608, 609, 610, 611, 612, 613, 119/614, 615, 616, 617, 618, 619, 620, 621, 119/623, 625, 630, 631, 632, 633; 407/29.11, 29.1, 29.15; 132/76.4, 108, 132/109, 110, 148, 150
See application file for complete search history.

(56) References Cited

U.S. PATENT DOCUMENTS

| | | | | |
|---|---|---|---|---|
| D100,558 S | * | 7/1936 | Hachman | D4/105 |
| 2,251,853 A | * | 8/1941 | Pandiyan | 15/176.2 |
| D154,227 S | * | 6/1949 | Alvizua | D28/59 |
| 2,491,753 A | * | 12/1949 | Morin | 132/104 |
| D177,325 S | * | 4/1956 | Heineman | D28/59 |
| 2,762,382 A | * | 9/1956 | Morgan, Sr. | 132/148 |
| 3,144,571 A | * | 8/1964 | Kukulski | 310/29 |
| 3,613,690 A | * | 10/1971 | Newell | 606/133 |
| D229,159 S | * | 11/1973 | Kinney | D7/696 |
| D246,000 S | * | 10/1977 | Yacos | D28/57 |
| D328,652 S | * | 8/1992 | Lunderman et al. | D28/57 |
| 5,673,711 A | * | 10/1997 | Andrews | 132/215 |
| 5,732,719 A | * | 3/1998 | Godbout | 132/76.4 |
| D457,220 S | * | 5/2002 | Huckaba | D22/149 |
| D472,642 S | * | 4/2003 | Henckel | D24/211 |
| 6,575,989 B1 | * | 6/2003 | Scheller et al. | 606/161 |
| 6,684,887 B2 | * | 2/2004 | Alexander | 132/112 |
| 7,967,834 B2 | * | 6/2011 | Tal et al. | 606/159 |
| 8,205,623 B2 | * | 6/2012 | Murzynski | 132/163 |

* cited by examiner

*Primary Examiner* — Rob Swiatek
*Assistant Examiner* — Ebony Evans
(74) *Attorney, Agent, or Firm* — Burgess Law Office, PLLC

(57) ABSTRACT

A grooming tool or hair grasping device suitable for effectively and efficiently removing unwanted hair from an animal's coat. The device includes a handle portion extending along a handle axis and having a first end including a stripping surface. The stripping surface is substantially tapered in a direction transverse to the handle axis and may include a roughened surface.

17 Claims, 7 Drawing Sheets

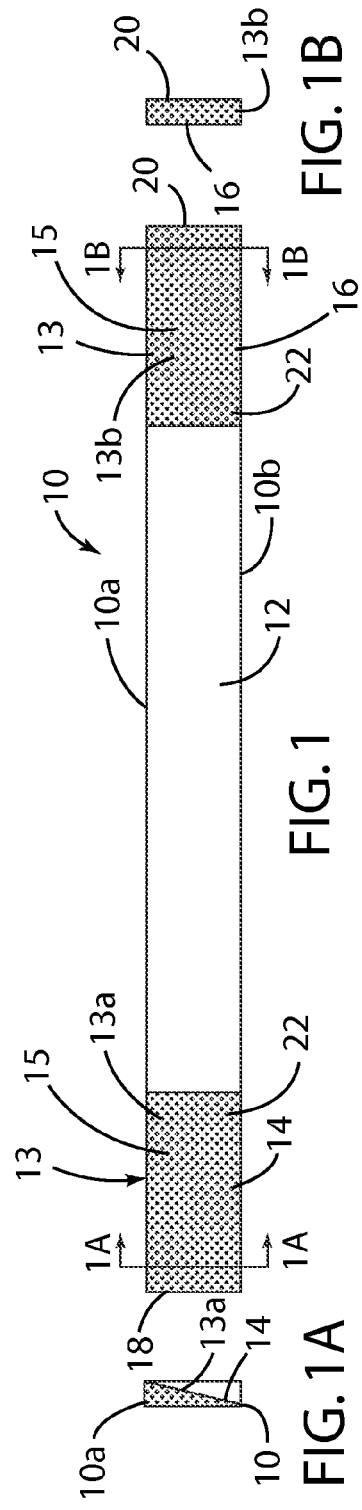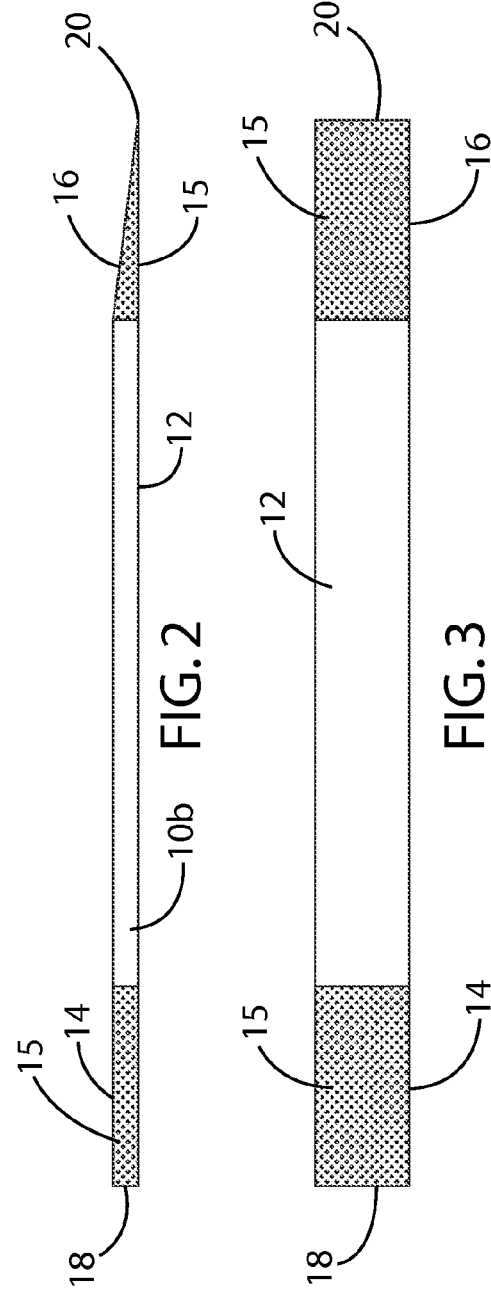

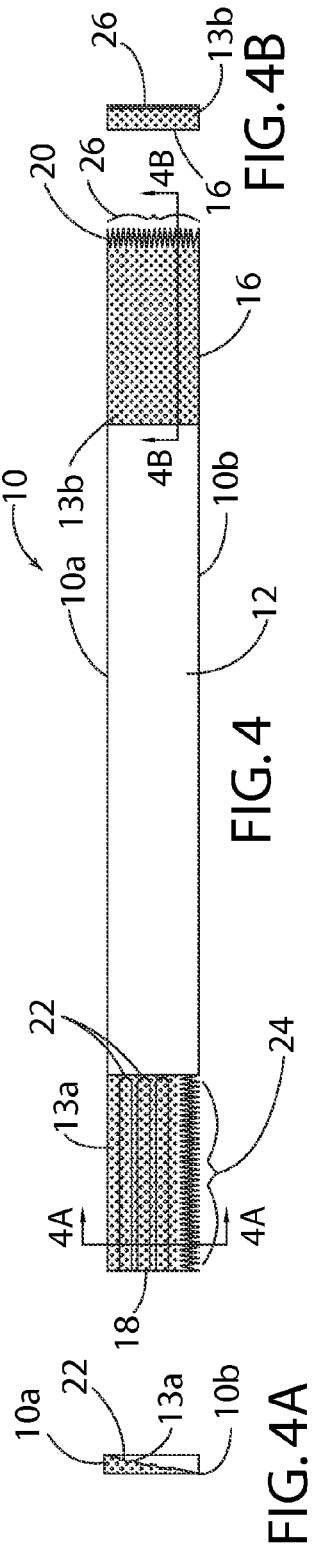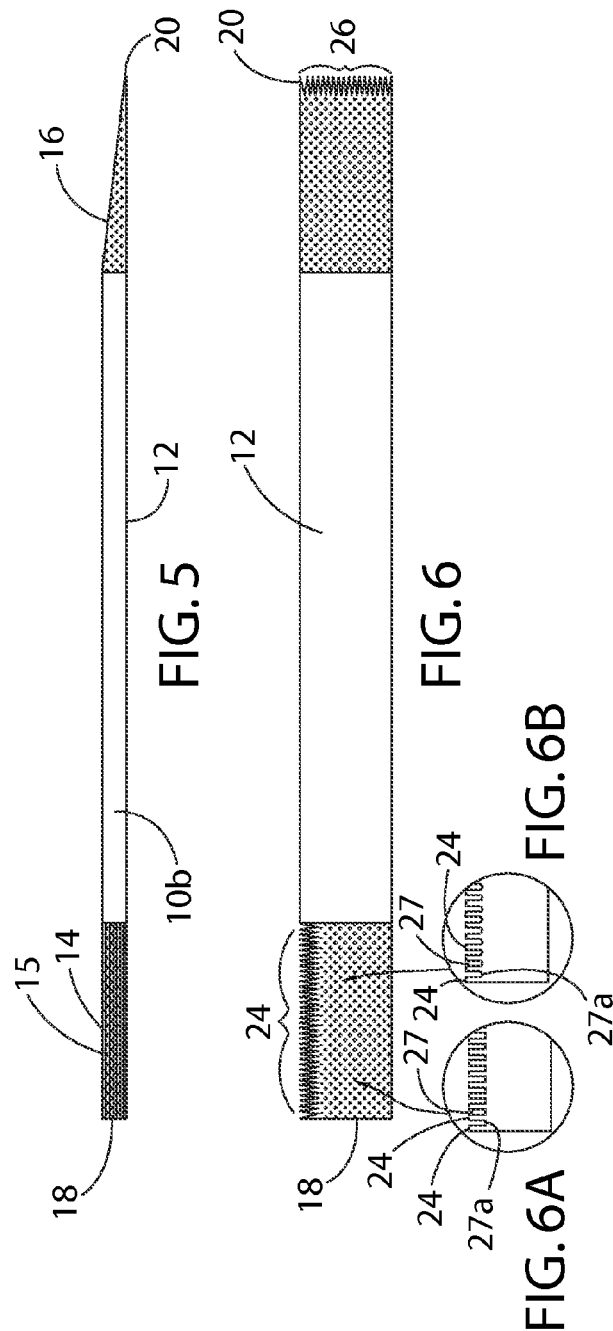

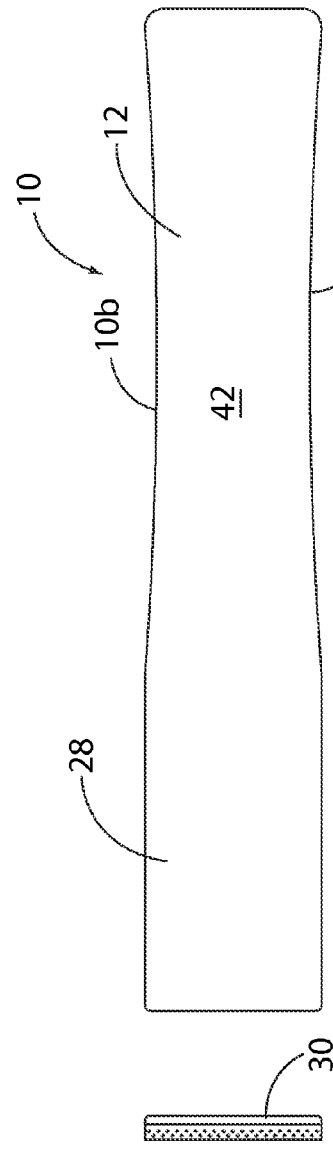
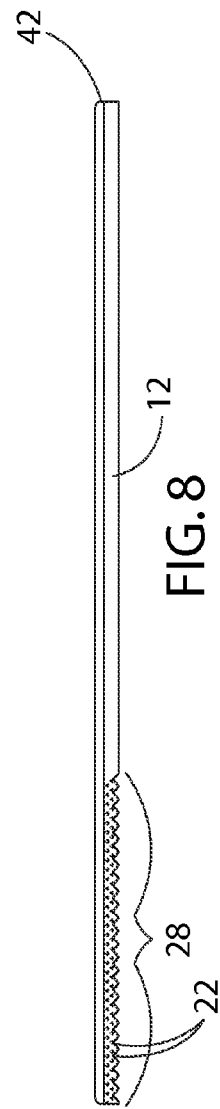
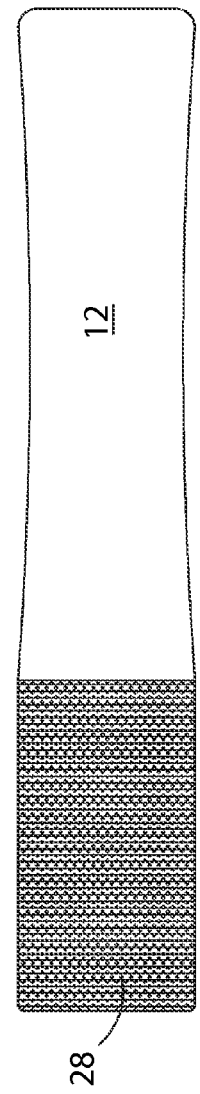
FIG. 7
FIG. 7A
FIG. 8
FIG. 9

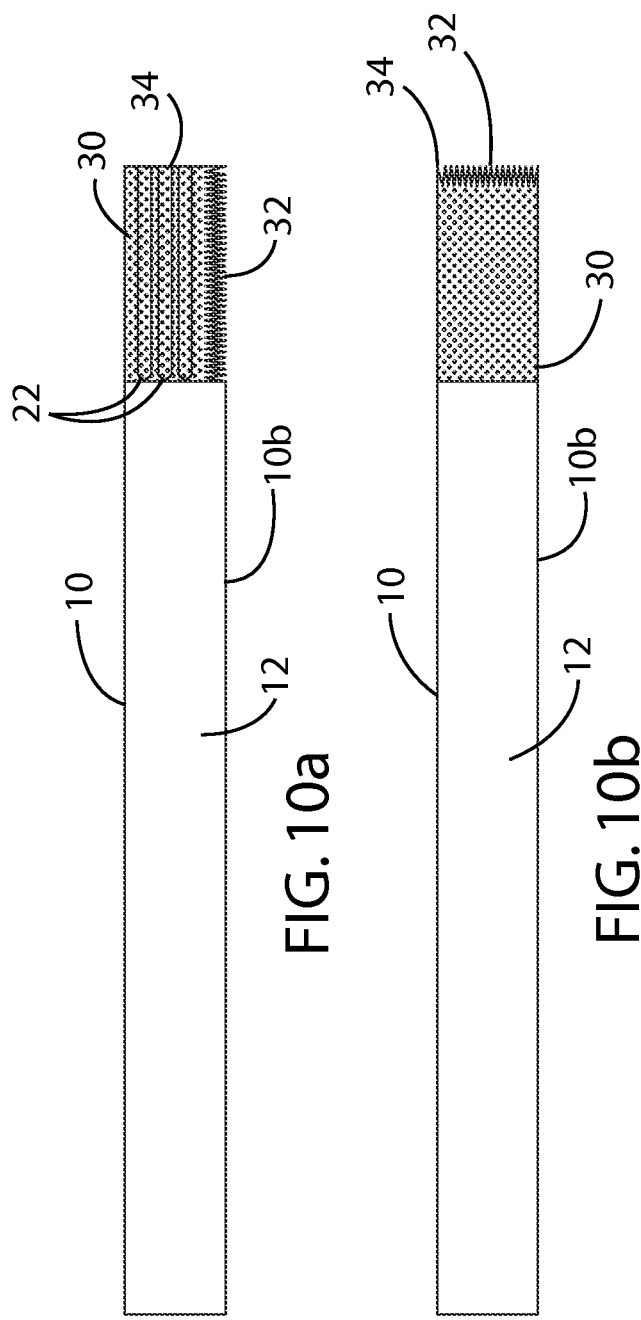

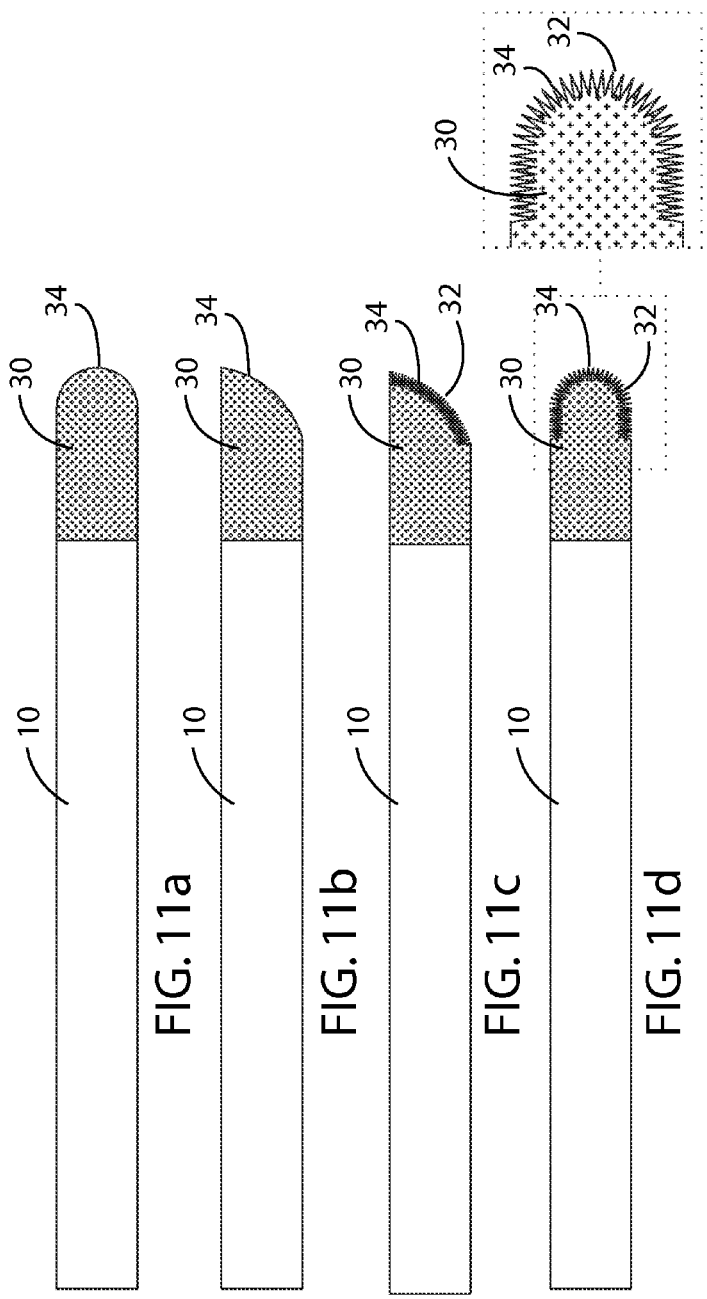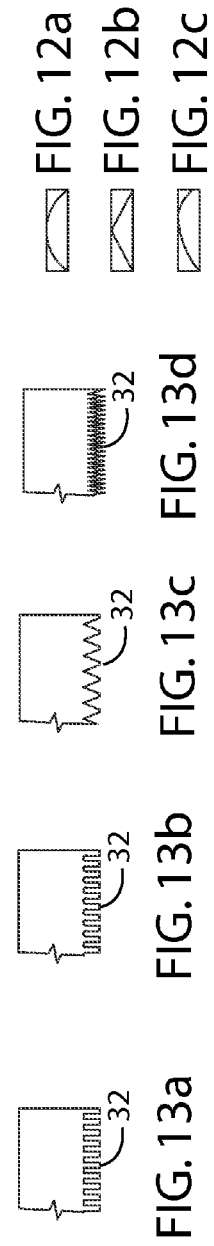

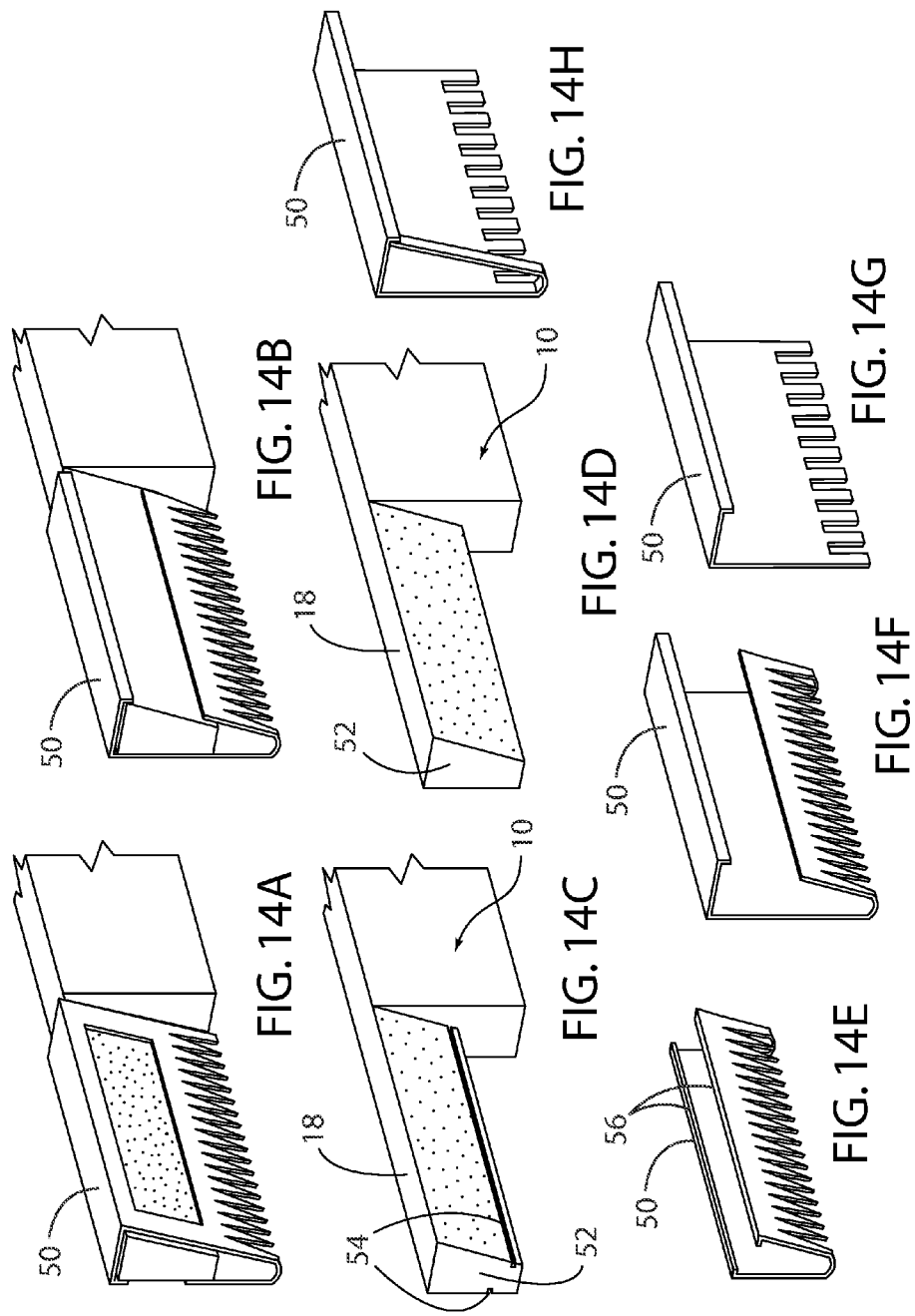

GROOMING DEVICE

CROSS-REFERENCE TO RELATED APPLICATIONS

This application claims the benefit of U.S. Provisional Application No. 61/372,825, filed Aug. 11, 2010.

FIELD OF THE INVENTION

The present invention relates to an animal grooming device that effectively and efficiently removes unwanted hair from the animal's coat while eliminating excessive, repetitive pulling of the coat that could lead to damaged and destroyed hair.

BACKGROUND OF THE INVENTION

Grooming of a feline or canine can be tedious and time consuming. Removal of excessive loose topcoat, maintaining a harsh coat, or removing unwanted undercoat on canines and felines is a very labor intensive and hand-crippling task. Professional kennel clubs have breed standards for registered canine breeds that require maintaining a breeds harsh coat and/or undercoat by removing unwanted hair.

Many problems have been noted throughout time regarding the processes of removing unwanted hair from a feline or canine. Conventional tools, such as fine toothed combs, have been in existence for many years and can be difficult to use. Due to slippage of the hair through the teeth of the comb, most of the unwanted hair is not removed. This process leads to an individual spending excessive time and effort on a task that can be done more effectively and timely. This repetitive process also has a tendency to damage the coat by stretching the hair needlessly and repeatedly. Many times, the hair will break.

SUMMARY OF THE INVENTION

The present invention provides a grooming device that has a handle portion extending along a handle axis with a first end that has a first stripping surface. The first stripping surface is tapered in a direction perpendicular to the handle axis and has a rough surface texture.

The hair-grasping device may also include a coating on the stripping surface to increase the roughness and the frictional force and thus the gripping effect between the device and the animal's coat. The hair grasping action takes place between any part of the hand and the stripping surface.

BRIEF DESCRIPTION OF THE DRAWINGS

FIG. 1 is a top view of a hair-grasping device in accordance with the present invention;

FIG. 1A is a cross-sectional view from line A-A in FIG. 1 of the hair-grasping device;

FIG. 1B is a cross-sectional view from line B-B in FIG. 1 of the hair-grasping device;

FIG. 2 is a side view of the hair-grasping device;

FIG. 3 is a bottom view of the hair-grasping device;

FIG. 4 is a top view of a second embodiment of the hair-grasping device;

FIG. 4A is a cross-sectional view from line A-A in FIG. 4 of the hair-grasping device;

FIG. 4B is an orthogonal view from line B-B in FIG. 4 of the hair-grasping device;

FIG. 5 is a side view of the second embodiment of the hair-grasping device;

FIG. 6 is a bottom view of the second embodiment of the hair-grasping device;

FIG. 7 is a top view of a third embodiment of the hair-grasping device;

FIG. 7A is an end view of the third embodiment of the hair-grasping device of FIG. 7;

FIG. 8 is a side view of the third embodiment of the hair-grasping device;

FIG. 9 is a bottom view of the third embodiment of the hair-grasping device;

FIGS. 10a and 10b are top views of a fourth embodiment of the hair-grasping device illustrating a plurality of teeth located on a side or end;

FIGS. 11a-11d are additional embodiments of the hair-grasping device illustrating uniquely shape working ends;

FIGS. 12a-12c are additional embodiments of the hair-grasping device illustrating alternative configurations of the end;

FIGS. 13a-13d illustrate various tooth styles or configurations for use with the hair-grasping device according to the present invention;

FIGS. 14A-H illustrate a perspective view of another embodiment of the present invention where in various styles of stripping combs that can be easily attached to the handle of the hair-grasping device;

DETAILED DESCRIPTION OF THE INVENTION

Figure 15:
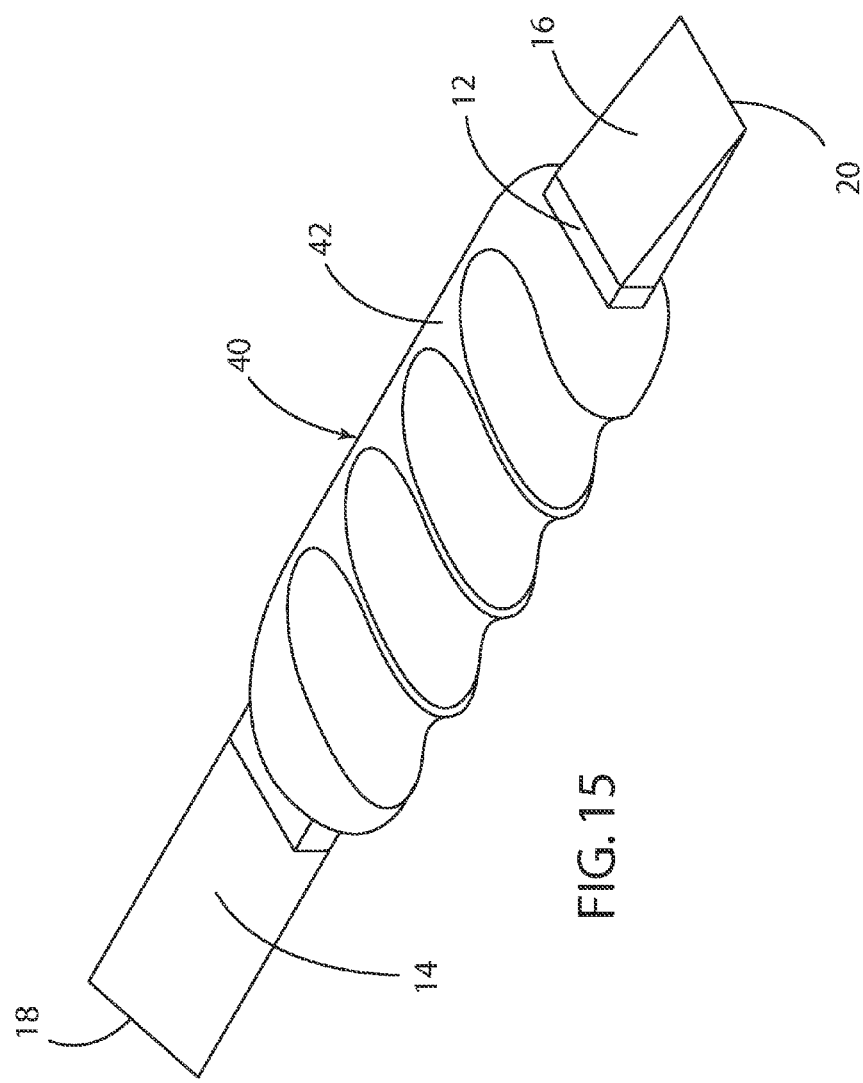
FIG. 15 illustrates a perspective view of an additional embodiment of the present invention that includes a formable handle/holder that can be customized to an individual user's hand.

Other advantages of the present invention will be readily appreciated, as the same becomes better understood by reference to the following detailed description when considered in connection with the accompanying drawings.

Certain terminology is used in the following description for convenience only and should not be considered limiting. For example, the words "right," "left," "lower," "upper," designate directions in the drawings to which reference is made.

FIGS. 1, 1A and 1B are views of a first embodiment of a hair-grasping device or grooming tool 10. The hair-grasping device or grooming tool 10 typically includes a handle 12 and one or more stripping/plucking portions 13. The hair-grasping device 10 is approximately 3-8" long by approximately 1/8"-2" wide by approximately 1/16"-1/2" thick. Width, length, thickness, and edge radius of hair-grasping device 10 may vary relative to types of hair to be pulled (stripped, pulled, plucked), the type of animal, and how much area is to be stripped, pulled or plucked. Accordingly, it is contemplated that the dimensions of the hair-grasping device 10 may vary beyond the dimensions set forth above. In the present embodiment, and as set forth more fully herein, a covering 40, an example of which is shown in FIG. 15, on the handle portion 12 of the hair-grasping device 10 may be used. The handle portion 12 of the hair-grasping device 10 may include a radius on the edges or upper and lower sides 10a, 10b. Length of the handle portion 12 of the hair-grasping device 10 varies depending on the types of hair to be pulled, what type of animal, and how much area is to be stripped. The hair-grasping device 10 may be made from various material as known in the art including, but not limited to: alloy steel composition, high-speed steel composition, carbon steel composition, cold work die steel, shock steel, hot work steel, aluminum (all alloys), brass, stainless steel, bronze and tin. In addition, different types of polymers or plastics are materials that may also be used for the device. Further, portions of the hair-grasping device 10 may be made of a metal while other portions are formed of a plastic or polymer; including, forming the handle portion 12 of plastic and providing a metal inlay forming a part of the stripping portion or surfaces 13 as set forth below, see also FIGS. 14A-H.

The hair-grasping device 10 as illustrated in FIG. 1 includes a handle portion 12, shown herein as an elongated metal object, shaped so as to fit comfortably within the hand of the user. The device 10 further includes a first stripping portion or surface 13a located on a first end 18 of the device 10 and a second plucking portion or surface 13b located on an opposite or second end 20 of the device 10. As shown in FIG. 1A, the stripping portion or surface 13a has a tapered portion 14 extending transverse a longitudinal axis of the handle portion 12. The tapered portion 14 starts at the lower side 10b and extends towards an upper side 10a of the hair-grasping device 10. As illustrated in FIG. 1A the tapered portion 14 gradually increases in thickness from the lower side 10a to the upper side 10b. FIG. 1B illustrates the plucking portion or surface 13b having a non-perpendicular tapered portion 16 extending generally in the direction of the longitudinal axis of the handle portion and outwardly to the right end 20 of the hair-grasping device 10. As illustrated in FIG. 2 the tapered portion 16 gradually decreases in thickness as it approaches the end 20.

While the handle 12 is disclosed having a configuration of a flat plate located in a single plane, the handle area 12 could have other configurations including being twisted, bent or otherwise situated such that the first 18 and second 20 ends and correspondingly the stripping portion 13a and plucking portion 13b lie in different orientations or planes. Additionally, while the stripping portion 13a and plucking portion 13b are shown as flat surfaces, they could have other surface configurations such as concave, convex, or include multiple facets, see FIGS. 12a-12c.

FIG. 1A represents a cross-sectional view of the stripping portion 13a located adjacent the first end 18 taken at line A-A in FIG. 1. FIG. 1A represents the transverse tapered portion 14 of the stripping portion 13a at the first end 18. The thicker part of the taper 14 is at the upper side 10a of the device 10 with the thinner portion located adjacent the lower side 10b of the device 10. The degree or amount of taper of the stripping portion 13a located adjacent the first end 18 is determined by the coarseness or fineness of the hair to be grasped by the hair-grasping device 10. It is further contemplated that the tapered portion 14 may be reversed to accommodate the preference of the user, such as for right-handed or left-handed users. It is contemplated that the taper angle of the stripping surface 13a and plucking surface 13b may vary depending upon the particular coat types of the canine or feline.

A coating 15 may also be used to increase the effectiveness and efficiency of the hair-grasping device 10 on either the first or second ends 18, 20. The coating 15 may include various surface treatments such as a diamond coat, application of a suitable particulate or other technologies, as known in the art that provide the stripping surface 13a and plucking surface 13b with a roughened or increased frictional surface that increases the gripping effect between the hair-grasping device 10 and the animal's coat. The coating 15 may partially or entirely cover the stripping surface 13a located at the first end 18 of the hair-grasping device 10, as indicated in FIG. 1. Optionally, the coating 15 could further include electroplating entirely or partially with a diamond or man-made diamond like coating. In addition, the stripping surface 13a may be covered by a diamond coated or man-made diamond coated snap-on or fastened-to insert, which would allow one to quickly change the first and second ends 18, 20 of the hair-grasping device 10 for a diverse variety of applications; see FIGS. 14A-H. The grit or size of the particulate matter of the coating 15 is contemplated as being between 200 and 14 grit. Depending upon the application, additional grit sizes may also be suitable. In addition, the coating 15 can be applied using an adhesive; for example, the particulate matter of the coating 15 forming the roughened or frictional surface may be applied and secured to the stripping surface using an adhesive. In addition, the roughened or frictional surface may be secured to the stripping surface as an adhesive backed strip of particulate matter. For example, a paper strip having a particulate on one side and an adhesive coating on the opposite side with a removable backing covering the adhesive can be secured to the hair grasping tool; i.e., the particulate forming the roughened side of the paper strip can be removeably secured to the hair grasping tool by removing the backing covering the adhesive and pressing the strip onto the hair grasping tool. Should the particulate matter become dull or clogged, it can be removed and a new strip of particulate matter applied to the tool.

In addition, the stripping surface 13a and plucking surface 13b may also include various surface treatments such as knurling, hatching, or other mechanical means to roughen the surface of the stripping surface 13a and plucking surface 13b. For example, the stripping surface 13a may also include grooves 22, as illustrated in FIG. 4. It is further contemplated that the stripping surface 13a and plucking surface 13b may include both a coating 15 and a surface treatment such as knurling, hatching or grooves.

A handle portion 12, as indicated in FIG. 1, is the center portion of the hair-grasping device 10. The handle portion 12 may or may not include a cover 40 formed of a material such as closed cell foam, rubber, or other pliant or resilient material that provides padding or a cushion. The reason for this is different techniques require unique handling of the hair-grasping device 10. Some coverings may be cumbersome and get in the way. However, a cover 40 may be necessary due to long hours of operation of the hair-grasping device 10, which could cause blisters. The edges of the handle portion 12 optionally may be radiused for comfort. It is understood that the cover 40 or a covering of some type may include a coating material or an optional padding to provide additional comfort and ergonomic use of the hair-grasping device 10.

The second end 20 is the right side of the hair-grasping device 10 in FIG. 1. The second end 20 exemplifies the slimness, as the angle of the taper 16 of the plucking surface 13b decreases in thickness from the handle portion 12, best shown in FIG. 2. The degree or amount of taper towards the second end 20 is determined by the coarseness or fineness of the hair or coat to be grasped by the hair-grasping device 10. The thicker part of the taper 16 of the plucking surface 13b is adjacent the handle portion 12. A different hair-grasping device 10 with a different taper angle will be produced for various different coat types. In addition, the coating 15 as previously discussed for the stripping surface 13a located at the first end 18 may be used on the plucking surface 13b located at the second end 20. As set forth previously, the coating 15 may include various surface treatments such as knurled, hatched or various surface etching along with a diamond coat or other technologies as known in the art to increase the gripping affect of the hair-grasping device 10 with the coat. Once again, the coating 15 may partially or entirely cover the plucking surface 13b located at the second end 20 of the hair-grasping device 10, as indicated in FIG. 1.

Referring to FIG. 2, the side view exemplifies the taper of the taper 16 more clearly. The thickness of the entire hair-grasping device 10 ranges from 1/16" to 1/2".

Referring to FIG. 3, the bottom view consists of both first and second ends 18, 20 with no taper on the bottom side of the hair-grasping device 10. However, it is further appreciated that a cover 40 or padding may be attached to the hair-grasping device 10 as previously discussed with the handle portion 12, above.

Referring to FIGS. 4-6, a second embodiment of the hair-grasping device 10 is shown. The second embodiment incorporates a shape and design similar to the first embodiment as shown in FIGS. 1-3. The second embodiment further includes a first set of teeth 24 located adjacent the thinner end of the first end 18 of the hair-grasping device 10. The second embodiment optionally may include a second set of teeth 26 at the end of the taper on the second end 20. The design of the first and second set of teeth 24, 26 can vary in width and depth and shape as needed for optimized use on specific types of hair, animal, and stripping technique required, see FIGS. 6A and 6B. FIG. 6A shows the gap 27 between adjacent teeth 24 having a square bottom 27a. In addition, FIG. 6B shows the gap 27 between adjacent teeth 24 having a round or semicircular bottom 27a. The stripping surface 13a and/or plucking surface 13b may optionally utilize grooves 22 as shown in FIG. 4.

FIG. 7 is a third embodiment of the hair-grasping device 10 utilizing a handle portion 12 and a coated area 28. The handle portion 12 is a unique shape, as shown in FIG. 7. A padding material 42 may be utilized with this third embodiment to provide additional comfort for the user and create a more contoured hair-grasping device 10 to the user's hand. The padding material 42 may be the same as discussed above with respect to the cover 40.

FIG. 7A is an end view of the third embodiment. The coated area 28 may optionally utilize grooves 22 as shown or various coatings that would include an electroplate process having a grit between 200 grit and 14 grit, as shown in FIG. 8. In addition, it is further contemplated that the coated area 28 could be various surface treatments as are known in the art. Referring to FIG. 9, the bottom view of the third embodiment clearly illustrates the coated area 28 and the handle portion 12 of the hair-grasping device 10.

FIGS. 10a-10b illustrate another embodiment of the hair-grasping device 10 including a handle 12 having a working end 30 including a plurality of teeth 32. As illustrated, the teeth 32 may be on end 34 or on the side surface 10b adjacent the end 34 as shown in FIG. 10b. In addition, as shown in FIG. 10a, the working end 30 may also include grooves 22.

FIGS. 11a-11d illustrate further embodiments of the hair-grasping device 10 having uniquely shaped working ends 30 some of which, including the ends 34, having full or partial arcuate configurations along with a plurality of teeth 32.

FIGS. 12a-12c illustrate various cross-sectional working end 30 configurations whereby the working end 30 may have a complex shape and configuration. For example, the hair-grasping device 10 may have a uniquely shaped working end 30 having a top view similar to that shown in FIG. 11b with an end view or cross-sectional view similar to that shown in FIG. 12c. In addition, the present invention contemplates grooves and surface coatings in addition to the configurations shown. Further, the combination and shapes are shown for illustrative purposes only and other configurations and shapes may also be selected.

FIGS. 13a-13d illustrate various tooth and tooth gap styles and configurations suitable for use with the hair-grasping device 10 of the present invention.

FIGS. 14A-H illustrate an additional embodiment wherein the various 50 inserts are applied over a post 52 formed on an end 18, 20 of the tool 10, see FIG. 14D. Each of the various inserts 50 having different teeth for grooming and grasping the hair. As illustrated in FIGS. 14A, 14C and 14D the post 52 may include a coating as set forth above. In addition, it is contemplated that other types of snap on or slide fit inserts may also be used. Further, the inserts 50 may include the coating as opposed to putting the coating on the post 52. The inserts 50 may be formed of a spring steel or some other material having resiliency such that they have a compressible fit or engagement with the post 52. for example the insert 50 has an upper flange and downwardly extending lip that fit snugly over the top of the post 52. In an additional embodiment a portion of the insert 50 adjacent the teeth may also engage the post 52 to further retain the insert 50 on the post 52. Another embodiment is that the insert has inwardly extending lips or flanges 56 that are received in grooves 54 on the post 52 such that the insert 50 is slidably attached to the post 52 as shown in FIGS. 14C and 14E. The insert 50 illustrated in FIGS. 14A and 14B may also include a inwardly extending flange or lip similar to that shown in FIG. 14E which engages a corresponding groove located in the post 50 on either side thereof.

FIG. 15 illustrates an additional embodiment of the hair-grasping device 10. The embodiment incorporates a shape and design similar to the first embodiment as shown in FIG. 1-3. The additional embodiment incorporates a cover 40 formed of a padding material 42. The padding material 42 may be made of material as known in the art including, but not limited to: polyethylene, foam, wood, polymer, clay or various other pliant or resilient materials as may be known in the art. For example the material may be a memory foam such as a visco-elastic polyurethane foam or low-resilience polyurethane foam. Accordingly, the material 42 can be formed to fit each individual user's hand, greatly enhancing comfort and the dexterity of the hair-grasping device. In some instances the material 42 permanently forms to the fit of the user's hand. In such an example the user's squeezes the material to deform and correspondingly shape the material according to the user's hand/grip. After which the material hardens, through various known processes, to achieve a permanent grip portion. Thus the handle 10 can include a cover 40 that may be hard or soft depending upon the material used. The cover may also have a permanent configuration or be adapt to each user's particular grip or hand. In addition, while shown with a the stripping portion or surface 13a having a tapered portion 14 extending transverse a longitudinal axis of the handle portion, the tapered portion 14 can be replaced with a post 52 and insert 50 combination of the type shown in FIG. 14A-14G.

Additional uses for the hair-grasping device 10 may include trimming and filing toenails.

Obviously, many modifications and variations of the present invention are possible in light of the above teachings. The invention may be practiced otherwise than as specifically described within the specification above.

What is claimed is:

1. A grooming device comprising:
    an elongated polyhedral body extending from a first end to a second end, said body including a top and a bottom, a first side connecting said top and bottom and a second side connecting said top and bottom, said body including a handle portion located between said first end and said second end and extending generally along a longitudinal axis of said body;
    a stripping surface located on said top adjacent said first end of said body;
    said stripping surface being substantially tapered in a direction transverse to the longitudinal axis and extending between said first and said second sides such that the spacing between said stripping surface and said bottom increases as said stripping surface extends towards said one of said sides, said stripping surface comprising a substantially rough surface texture;

a plucking surface located on said top adjacent said second end of said body;

the plucking surface being substantially tapered in a direction parallel to the longitudinal axis of said body; and the plucking surface comprising a substantially rough surface texture.

2. A grooming device as set forth in claim 1, wherein said stripping surface includes a particulate coating.

3. A grooming device as set forth in claim 1, further comprising a plurality of teeth extending in a substantially perpendicular direction to the longitudinal axis of said body and ending at an apex of the stripping surface.

4. A grooming device as set forth in claim 1, further comprising a plurality of teeth extending in a substantially parallel direction to the handle longitudinal axis of said body and ending at an apex of the plucking surface.

5. A grooming device as set forth in claim 1, further comprising an ergonomic material substantially enclosing the handle portion.

6. A grooming device as set forth in claim 1, further comprising a moldable material substantially enclosing the handle portion configured to substantially mold to a user's hand.

7. A grooming device as set forth in claim 1, wherein said stripping surface includes a diamond or diamond like coating.

8. A grooming device as set forth in claim 1, wherein at least one of said stripping surface and said plucking surface includes a particulate matter coating having a grit size between 200 and 14.

9. A grooming device comprising:
an elongated body having a longitudinal axis, said body including a handle portion, said body having a top portion and a bottom portion and side portions;
said body having a first end and a second end;
a first surface on said top portion, said first surface adjacent the first end and extending between said side portions;
said first surface sloping inwardly towards said bottom portion;
said first surface having a rough finish;
a second surface on said top portion adjacent the second end of the handle portion and extending inwardly from said second end;
the second surface sloping inwardly from said top portion towards said bottom portion; and
said second surface having a rough finish.

10. A grooming device as set forth in claim 9, further comprising a cushioning material on said handle portion.

11. A grooming device as set forth in claim 9, further including a frictional coating on at least one of said first surface and said second surface.

12. A grooming device as set forth in claim 9, further comprising a plurality of teeth on the first surface and said teeth extending in a substantially perpendicular direction to the longitudinal axis.

13. A grooming device as set forth in claim 9, further including a diamond coating applied to at least one of said first surface and said second surface.

14. A grooming device as set forth in claim 9, further including a particulate matter coating having a grit size between 200 and 14 applied to at least one of said first surface and said second surface.

15. A grooming device comprising:
a body extending generally along a longitudinal axis, said body having a handle portion;
a pliable material substantially enclosing the handle portion configured to substantially mold to a user's hand;
said body having a first end;
a stripping surface located adjacent said first end;
said stripping surface tapered in a direction transverse to the longitudinal axis; and
said stripping surface comprising a substantially rough surface texture; and
a plurality of teeth extending in a substantially perpendicular direction to the longitudinal axis and ending at an apex of the stripping surface.

16. A grooming device comprising:
a body extending generally along a longitudinal axis, said body having a handle portion;
a pliable material substantially enclosing the handle portion configured to substantially mold to a user's hand;
said body having a first end and a second end;
a stripping surface located adjacent said first end;
said stripping surface tapered in a direction transverse to the longitudinal axis; and
said stripping surface comprising a substantially rough surface texture;
a plucking surface located adjacent said second end;
said plucking surface being substantially tapered in a direction parallel to the longitudinal axis;
said plucking surface comprising a substantially rough surface texture; and
a plurality of teeth extending in a substantially parallel direction to the longitudinal axis and ending at an apex of said plucking surface.

17. A grooming device as set forth in claim 16, further including a particulate matter coating having a grit size between 200 and 14 applied to at least one of said stripping surface and said plucking surface.

* * * * *